(12) United States Patent
Arimoto et al.

(10) Patent No.: US 10,894,465 B2
(45) Date of Patent: Jan. 19, 2021

(54) SEAL ASSEMBLY FOR AUTOMOTIVE DOOR MODULE

(71) Applicant: Hi-Lex Controls, Inc., Rochester Hills, MI (US)

(72) Inventors: Shigeki Arimoto, Bloomfield Hills, MI (US); Beau Cook, Holly, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 230 days.

(21) Appl. No.: 16/012,936

(22) Filed: Jun. 20, 2018

(65) Prior Publication Data

US 2019/0009659 A1 Jan. 10, 2019

Related U.S. Application Data

(60) Provisional application No. 62/530,815, filed on Jul. 10, 2017.

(51) Int. Cl.
| | |
|---|---|
| *B60J 5/04* | (2006.01) |
| *B60J 10/76* | (2016.01) |
| *B60J 10/00* | (2016.01) |
| *E05F 15/692* | (2015.01) |
| *E05F 15/689* | (2015.01) |
| *E05F 15/695* | (2015.01) |
| *E05F 15/697* | (2015.01) |

(52) U.S. Cl.
CPC .......... *B60J 5/0418* (2013.01); *B60J 5/0416* (2013.01); *B60J 10/45* (2016.02); *B60J 10/76* (2016.02); *E05F 15/689* (2015.01); *E05F 15/692* (2015.01); *E05F 15/695* (2015.01); *E05F 15/697* (2015.01)

(58) Field of Classification Search
CPC .......... B60J 5/0418; B60J 10/86; B60J 10/87
See application file for complete search history.

(56) References Cited

U.S. PATENT DOCUMENTS

| | | | | |
|---|---|---|---|---|
| 2005/0016071 | A1* | 1/2005 | Takeda | B60J 5/0416 49/352 |
| 2006/0265964 | A1* | 11/2006 | Winborn | B60J 5/0468 49/502 |
| 2009/0322118 | A1* | 12/2009 | Koa | B60J 5/0418 296/146.7 |

(Continued)

FOREIGN PATENT DOCUMENTS

| | | | | |
|---|---|---|---|---|
| CA | 2481013 A1 * | 4/2004 | ............ | E05F 11/488 |
| DE | 102005044114 A1 * | 3/2007 | ............ | B60J 5/0418 |
| WO | WO-2008046623 A1 * | 4/2008 | ............ | B60J 5/0418 |

*Primary Examiner* — Marcus Menezes
(74) *Attorney, Agent, or Firm* — Dickinson Wright PLLC

(57) ABSTRACT

A door assembly may include a sub-assembly having a sub-assembly panel, one or more rails, an edge strip, and a sealing gasket. The rails may extend from the sub-assembly panel and may overhang an edge of the panel to be sealed. The edge strip may be configured to seal the panel extending across a region of the edge where the rail overhangs the edge. The sealing gasket may be a foam-in-place gasket. The sealing gasket may be applied to the sub-assembly panel around the perimeter of the sub-assembly panel and may interact with the edge strip at the region where the at least one rail overhangs the edge to form a contiguous seal around the sub-assembly panel.

13 Claims, 7 Drawing Sheets

(56) References Cited

U.S. PATENT DOCUMENTS

| | | | |
|---|---|---|---|
| 2014/0259952 A1* | 9/2014 | Sheehy | B60J 5/0418 49/475.1 |
| 2015/0084288 A1* | 3/2015 | Arata | F16J 15/022 277/637 |
| 2017/0274743 A1* | 9/2017 | Benson | B60J 5/0429 |
| 2018/0354349 A1* | 12/2018 | Fortin | B60J 5/0418 |
| 2020/0148048 A1* | 5/2020 | Dunn | B60J 10/45 |

* cited by examiner

SEAL ASSEMBLY FOR AUTOMOTIVE DOOR MODULE

CROSS REFERENCE TO RELATED APPLICATIONS

This application claims the benefit of U.S. Provisional Patent Application No. 62/530,815 filed Jul. 10, 2017, the content of which is hereby incorporated by reference in its entirety.

BACKGROUND

1. Field of the Invention

The present application generally relates to sealing vehicle assemblies. More specifically, the invention relates to sealing of a component or subassembly within a door assembly for a vehicle door.

2. Description of Related Art

With the increase of electronically automated functionality in vehicles, various electrical assemblies are increasingly installed into vehicle doors. For example a window regulator assembly is provided for supporting and guiding the movement of movable glass in a vehicle side door, generally powered by an electric motor. The window regulator assembly is typically mounted to a door inner panel. Often door inner panel assemblies will be pre-assembled and later attached to the door outer skin. The fully assembled door panels should be sealed to protect the installed assemblies and reduce noise and prevent water and air leakage. A typical operation involves affixing the window regulator assembly being part of a modular assembly with the window regulator guide channels motor and cable guide mountings etc. which is bonded to or affixed to an opening having an edge surrounding the outer perimeter of the assembly. One method of sealing such subassemblies to a door inner panel includes applying a semi liquid sealant or a foam sealant to the panel that acts as a seal against the door inner panel. In some instances, window guide rails may extend beyond the outer perimeter of the window regulator assembly. These rails may over hang regions of the edge of the panel. In the case of applying a foam sealant bead, applying foam underneath these overhanging regions may be challenging because ideally the nozzle dispensing the foam would be perpendicular to the surface of the panel where the overhanging portion interferes with such access.

In view of the above, it is apparent that there exists a need for an improved assembly and method for sealing components or subassemblies to door assemblies.

SUMMARY

In satisfying the above need, as well as overcoming the enumerated drawbacks and other limitations of the related art, the present disclosure provides an improved assembly and method for sealing components or subassemblies of door assemblies.

A typical door assembly may include a door outer panel, an inner panel, and a window regulator assembly having one or more guide rails, an edge strip, and a sealing gasket. The rails may extend from the sub-assembly panel and may overhang an edge of the panel to be sealed. The edge strip may be configured to seal the panel extending across a region of the edge where the rail overhangs the edge. The sealing gasket may be a foam-in-place gasket. The sealing gasket may be applied to the sub-assembly panel around the perimeter of the sub-assembly panel and may interact with the edge strip at the region where the at least one rail overhangs the edge to form a contiguous seal around the sub-assembly panel. The edge strip may have a sealing portion or a foam-in-place gasket that contact and form a seal with sealing gasket applied to the sub-assembly panel. The edge strip may overlap the sealing gasket in one or more directions to improve the sealing between the gasket and regions of the panel.

Further objects, features and advantages of this disclosure will become readily apparent to persons skilled in the art after a review of the following description, with reference to the drawings and claims that are appended to and form a part of this specification.

DETAILED DESCRIPTION

Figure 1:
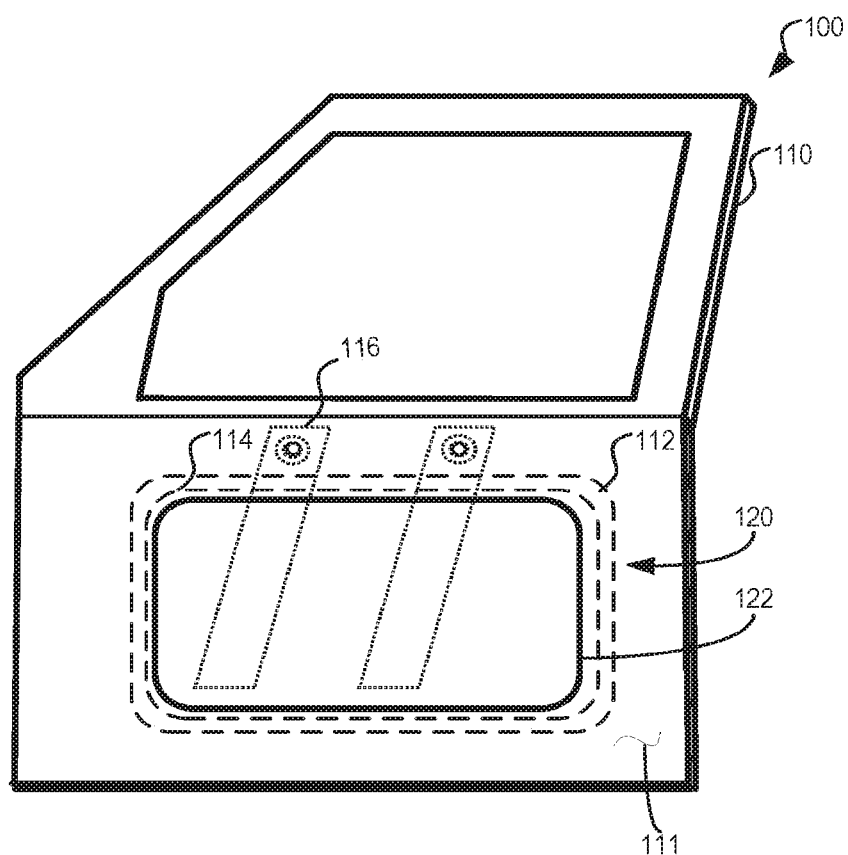
FIG. 1 is a schematic view of a vehicle door.

FIG. 1 is a schematic view of a vehicle door assembly 100. The vehicle door assembly 100 includes door outer panel 110, a door inner panel 111, and sub-assembly 120 (e.g. a window regulator assembly). The sub-assembly 120 may include a sub-assembly panel 112 and glass slide rails 116. The window regulator electronics and slide rails may be provided as a sub-assembly mounted to the panel 112. The panel 112 may also include cable channels and cable pulley mounts for the cable system which guides the side door glass between open and closed positions as the glass panel (not shown) slides along the slide rails. The window regular assembly and slide rails may provided as a single window regulator subassembly. The subassembly panel 112 may have an outer perimeter edge which forms a seal against the perimeter edge of the door inner panel aperture 122 when the components are assembled. It may be important that when sub-assembly 120 is mounted position, a weathertight seal 114 is provided at the interface around the perimeter edges of the sub-assembly panel 112 and the inner door panel 111. In certain embodiments, the rails 116 may overhang the edge of the window regulator subassembly. The seal 114 may form a continuous seal of the sub-assembly against the inner door panel 111 to prevent the passage of moisture through the aperture in the door assembly 100. The perimeter of the sub-assembly panel 112 where the seal 114 will be applied may be plasma treated to improve adhesion characteristics of the panel 112 to the seal 114.

The seal 114 may be provided through a foam-in-place gasket that is applied around the perimeter edge of the sub-assembly panel 112. The rails 116 may overhang the edge of the sub-assembly panel 112. The position of the rails 116 may cause difficulties when placing the seal 114 in the form of a liquid applied dispensed material around the perimeter where the rails overhang the edge of the sub-assembly panel. Ideally, when applying a foam-in-place gasket the nozzle applying the gasket would be oriented perpendicular to the surface to which the foam-in-place gasket is applied. However, the overhanging region of the rails may make optimal positioning of the nozzle difficult or impossible.

Figure 2:
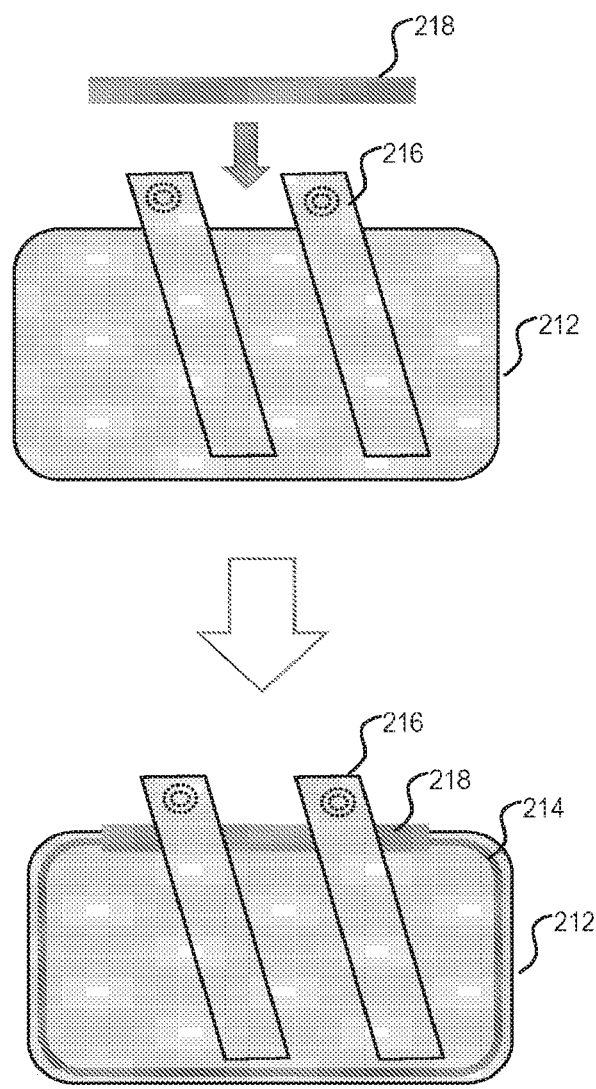
FIG. 2 is an illustration of one method for applying the seal to a sub-assembly panel assembly.

FIG. 2 is an illustration of one method for applying a seal to the sub-assembly. The sub-assembly panel 212 may have rails 216 extending from the sub-assembly panel 212 and overhanging an edge of the sub-assembly panel 212. As previously discussed, the region where the rails 216 overhang the sub-assembly panel 212 may be a difficult area in which to apply a foam-in-place gasket. Accordingly, separately manufactured edge strip 218 may be applied to the edge in the region where the rails 216 overhang the edge. As such, the edge strip 218 may provide sealing in the overhanging region. For example the edge strip 218 may be formed of a solid EPDM (Ethylene Propylene Diene Monomers) or TPV (Thermoplastic Vulcanizates) material. The edge strip 218 may be extruded and, therefore, may have a uniform cross-sectional profile that is configured to mate over the edge of the sub-assembly panel 212. The edge strip 218 may be installed onto the panel assembly by hand or may be machine installed.

A region around the perimeter of the of the sub-assembly panel 212 where the sealing material 214 will be placed may be plasma treated to improve adhesion characteristics of the sub-assembly panel 212 to the sealing material 214. Once the edge strip is placed over the edge in the overhanging region, a sealing material 214 may be placed around the perimeter of the sub-assembly panel 212. The sealing material 214 may be a foam-in-place gasket. The sealing material 214 may abut or overlap with the edge strip 218 to form a contiguous seal around the perimeter of the edge panel 212. In various alternative implementations, the sealing material 214 may be applied before or after installation of the edge strip 218.

Figure 3A:
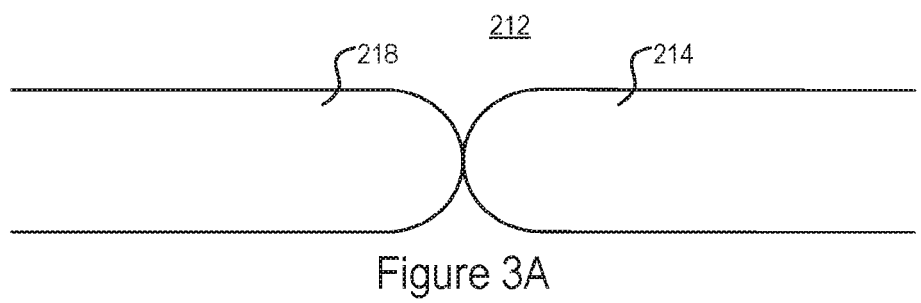
FIGS. 3A, 3B, and 3C illustrate various ways the edge strip may interface with the sealing material.
Figure 3B:
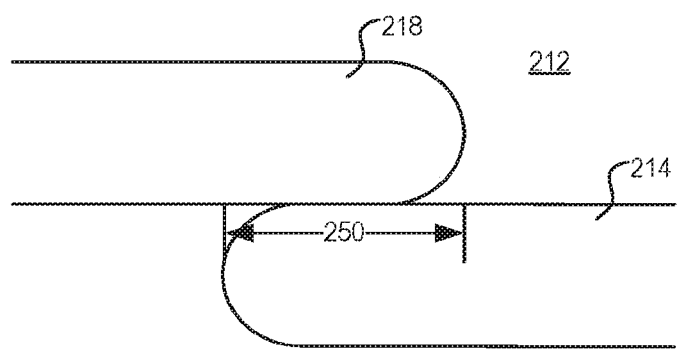
Figure 3C:
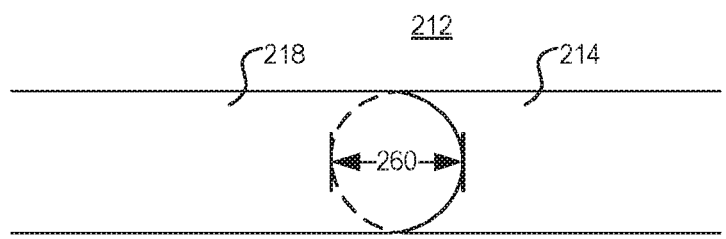

In order to provide a continuous seal around the perimeter of edge it may be desirable that an interface between the sealing material 214 and the edge strip 218 be provided. The interface may be a chemical bonding between the sealing material 214 and a portion (e.g. a sealing portion) of the edge strip 218. FIG. 3A illustrates a end of the sealing portion of the edge strip 218 abutting an end of the sealing material 214. The ends may form a chemical bond with one another. FIG. 3B illustrates a side of the sealing portion of the edge strip 218 overlapping 250 longitudinally with a side of the sealing material 214. The side of the sealing portion may chemically bond with the side of the sealing material 214. FIG. 3C illustrates the sealing portion of the edge strip 218 extending over the sealing material 214. As such, the sealing material 214 may be sandwiched between the edge strip 218 and the sub-assembly panel 212. The region where the edge strip 218 extends over the sealing material 214 forms an overlap region 260. Although, it is also contemplated that the sealing material 214 could be applied over the edge strip 218, sandwiching the edge strip 218 between the sealing material 214 and the sub-assembly panel 210.

Figure 4A:
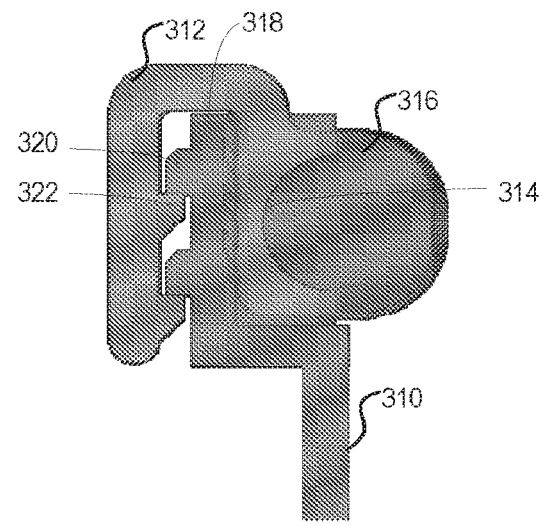
FIG. 4A is a sectional side view of one implementation of the panel assembly.
Figure 4B:
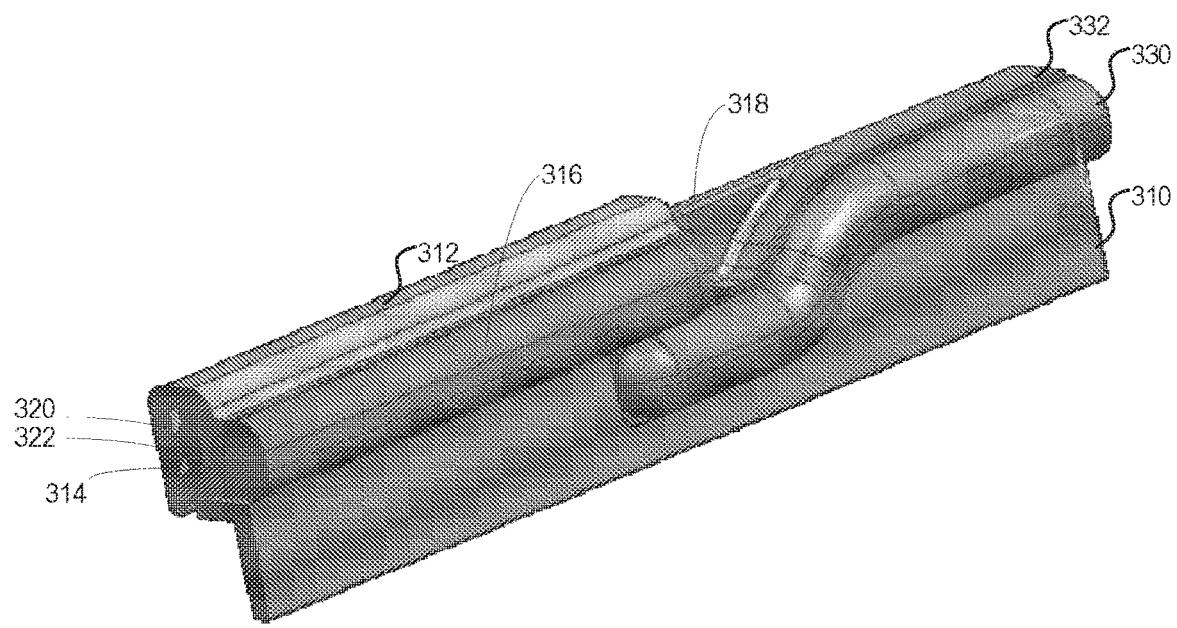
FIG. 4B is a perspective view of the panel assembly in FIG. 4A.

FIG. 4A is a sectional side view of one implementation of the panel assembly. FIG. 4B is a perspective view of the panel assembly in FIG. 4A. The panel assembly includes a sub-assembly panel 310, an edge strip 312, and a seal 330. The sub-assembly panel 310 may be a plastic module or plate. The sub-assembly panel may be formed to be installed within a hole on the inner panel of an inner door panel. The seal 330 prevents moisture from traveling through the hole between the inner door panel and the sub-assembly, as well as, reducing noise.

The sub-assembly panel 310 may include rails that overhang an edge 318 of the sub-assembly panel 310. The edge strip 312 may be placed over the edge 318 in the region where the rails overhang the sub-assembly panel. The edge strip 312 may be formed from an EPDM or TPV (Thermoplastic Vulcanizates) material. Further, the edge strip may be an extruded part and, therefore, may have a uniform cross-sectional profile along the length of the edge strip.

The edge strip 312 may be formed of a high durometer material, for example, the edge strip may have a durometer value of 80-90 Shore A scale. The edge strip 312 may be formed of a solid rubbery material which is flexible enough to follow the curvature on the plate and strong enough to fasten to the plate with retaining feature. The edge strip 312 may be fitted over the edge 318 of the panel 310 and extend downward along both sides of the panel 310. The portions extending downward along the side of the panel 310 may include locking features 322 that engage with locking features 320 of the sub-assembly panel 310. Accordingly, the edge strip 312 may be locked into place over the edge 318 of the sub-assembly panel 310. One of the sides of the edge strip may extend along the side of the sub-assembly panel 310 and may form a channel 314 within the edge strip 312.

A foam-in-place gasket 316 may be applied within the channel 314. The foam-in-place gasket 316 may be applied to the edge strip 312 prior to fitting the edge strip 312 on the edge 318 of the sub-assembly panel 310. A plasma treatment or primer may be applied to the channel 314 prior to the application of the foam-in-place gasket 316 to improve adhesion between the surface of the channel 314 and the foam-in-place gasket 316.

The sub-assembly panel 310 may also have a channel 332 configured to receive a foam-in-place gasket around the perimeter of the rest of the sub-assembly panel that is not in the region where the rails are overhanging the edge of the sub-assembly panel. As such, a foam-in-place gasket 330 may be applied within the channel 332 around the perimeter of the sub-assembly panel 310. A plasma treatment or primer may be applied to the channel 332 prior to the application of the foam-in-place gasket 330 to improve adhesion between the surface of the channel 332 and the foam-in-place gasket 330.

The foam-in-place gasket 316 and the foam-in-place gasket 330 may contact each other to form a contiguous seal around the perimeter of the panel. In some implementations, the side of the foam-in-place gasket 316 may overlap with the side of the foam-in-place gasket 330 to provide an improved sealing between regions of the sub-assembly panel 310 and the edge strip 312.

Figure 5A:
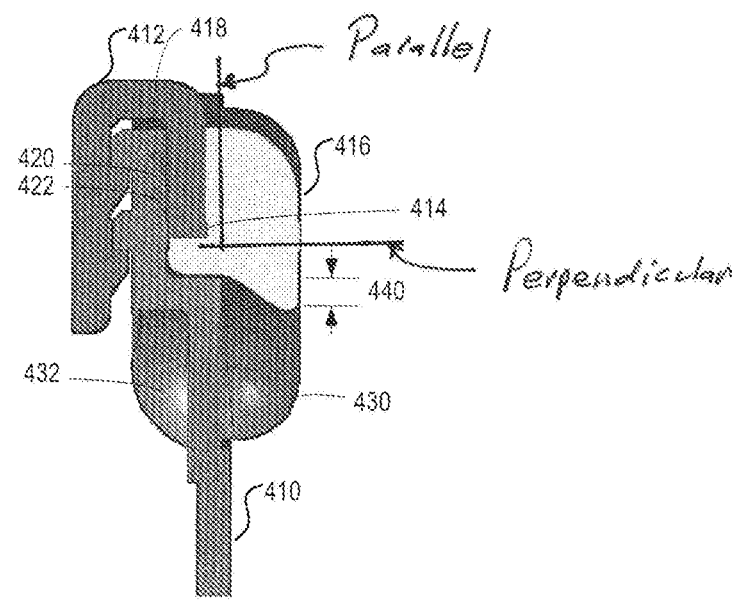
FIG. 5A is a sectional side view of another implementation of the panel assembly.
Figure 5B:
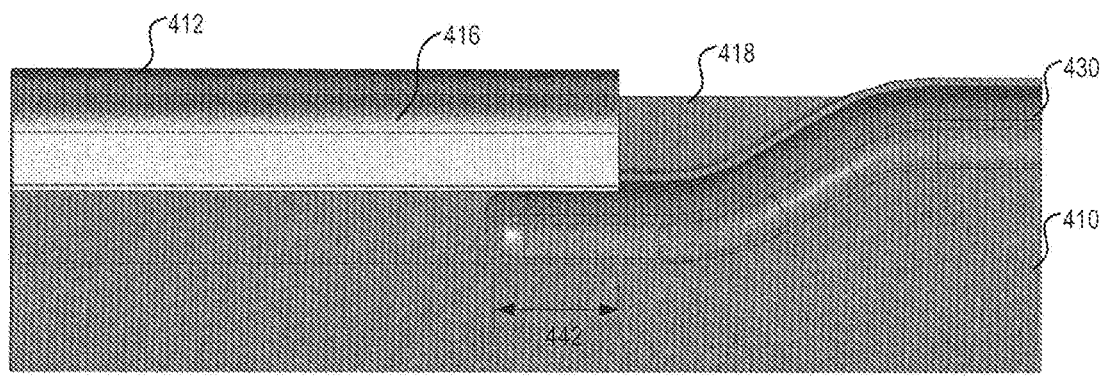
FIG. 5B is a front view of the panel assembly in FIG. 5A.

FIG. 5A is a sectional side view of another implementation of the panel assembly. FIG. 5B is a front view of the panel assembly in FIG. 5A. The panel assembly includes a sub-assembly panel 410, an edge strip 412, and a seal 430. The sub-assembly panel 410 may be a plastic module or plate. The sub-assembly panel may be formed to be installed within a hole on the inner panel of a door assembly. The seal 430 prevents moisture (water, air) from traveling through the hole between the door assembly and the panel assembly, as well as, reducing noise.

The sub-assembly panel 410 may include rails that overhang an edge 418 of the sub-assembly panel 410. The edge strip 412 may be placed over the edge 418 in the region where the rails overhang the sub-assembly panel. The edge strip 412 may be formed from an EPDM (Ethylene Propylene Diene Monomers) or TPV (Thermoplastic Vulcanizates) material. Further, the edge strip may be an extruded part and, therefore, may have a uniform cross-sectional profile along the length of the edge strip.

The edge strip 412 may be formed of a high durometer material, for example, the edge strip may have a durometer reading of 80-90. The edge strip 412 may be fitted over the edge 418 of the panel 410 and extend downward along both sides of the panel 410. The portions extending downward along the side of the panel 410 may include locking features 422 that engage with locking features 420 of the sub-assembly panel 410. The locking features may be provided on one or both sides of the sub-assembly panel 410. Accordingly, the edge strip 412 may be locked into place over the edge 418 of the sub-assembly panel 410. One of the sides of the edge strip may extend along the side of the sub-assembly panel 410 and include a sealing portion 416. The sealing portion 416 may be formed of an EPDM or TPV (Thermoplastic Vulcanizates) sponge material. In one example, the EPDM or TPV closed cell sponge material may have a density of about 0.2-0.5 g/cm$^3$. Although, it is understood that other elastic materials may be used for the sealing portion 416. The sponge material may be bonded to a solid rubber portion of the of the edge strip 412 that extends over the edge 418 and engages the panel 410. However, the sealing portion 416 may be attached to an attachment surface 414 of the edge strip 412 using various methods including molding, adhesive, etc.

While the engaging portion of the edge strip 412 may be formed of a higher density material than the sealing portion 416, the engaging portion of the edge strip 412 may also be formed of the same material as the sealing portion 416 or a material similar to the density of the sealing portion 416. The edge strip 412 may be snapped over the edge 418 or slid onto the edge 418 from the side of the panel 410. Further, the edge strip may be extruded or molded or over-molded onto the panel 410 and may have a top edge that is straight or forms a transitional curve. While the sealing portion 416 is shown a solid, the sealing portion 416 may be hollow, for example as shown in FIG. 7.

The sub-assembly panel 410 may have a channel 432 configured to receive a foam-in-place gasket around the perimeter of the rest of the sub-assembly panel that is not in the region where the rails are overhanging the edge of the sub-assembly panel. As such, a foam-in-place gasket 430 may be applied within the channel 432 around the perimeter of the sub-assembly panel 410. A plasma treatment or primer may be applied to the channel 432 prior to the application of the foam-in-place gasket 430 to improve adhesion between the surface of the channel 432 and the foam-in-place gasket 430.

The sealing portion 416 and the foam-in-place gasket 430 may contact each other to form a contiguous seal around the perimeter of the panel. The side of the sealing portion 416 may overlap with the side of the foam-in-place gasket 430 to provide an improved sealing between regions of the sub-assembly panel 410 and the edge strip 412. The sealing portion 416 of edge strip 412 may overlap the foam-in-place gasket 430 in a direction parallel with the edge (with a plane parallel to the edge designated in FIG. 5A as Parallel). In some implementations, the sealing portion 416 of edge strip 412 may overlap the foam-in-place gasket 430 in a direction perpendicular with the edge and the panel 410 (with a plane perpendicular to the edge designated in FIG. 5A as Perpendicular) to form a vertical overlap region 440. In some implementations, the sealing portion 416 of edge strip 412 may form a horizontal overlap region 443 with a longitudinal side of the foam-in-place gasket 430. Further, the locking features may force the sealing portion 416 of the edge strip 412 against the foam-in-place gasket 430.

Figure 6A:
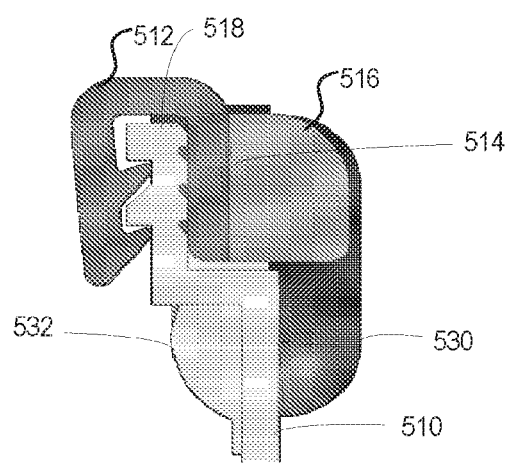
FIG. 6A is a sectional side view of another implementation of the panel assembly.
Figure 6B:
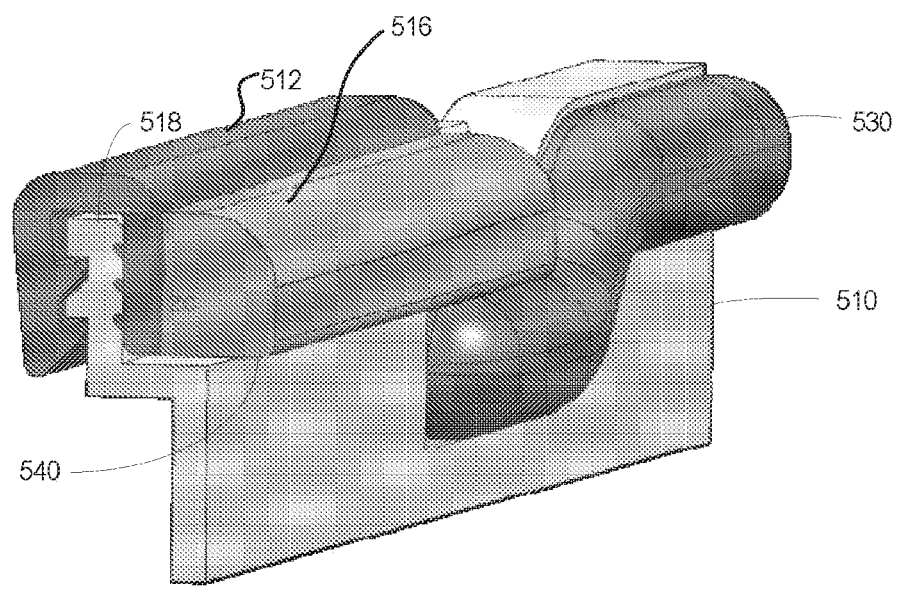
FIG. 6B is a perspective view of the panel assembly in FIG. 6A.

FIG. 6A is a sectional side view of another implementation of the panel assembly. FIG. 6B is a perspective view of the panel assembly in FIG. 6A. The panel assembly includes a sub-assembly panel 510, an edge strip 512, and a seal 530. The sub-assembly panel 510 may be a plastic module or plate. The sub-assembly panel may be formed to be installed within a hole on the inner panel of a door assembly. The seal 530 prevents moisture from traveling through the hole between the door assembly and the panel assembly, as well as, reducing noise.

The sub-assembly panel 510 may include rails that overhang an edge 518 of the sub-assembly panel 510. The edge strip 512 may be placed over the edge 518 in the region where the rails overhang the sub-assembly panel. The edge strip 512 may be formed from an EPDM (Ethylene Propylene Diene Monomers) or TPV (Thermoplastic Vulcanizates) material. Further, the edge strip may be an extruded part and, therefore, may have a uniform cross-sectional profile along the length of the edge strip.

The edge strip 512 may be formed of a high durometer material, for example, the edge strip may have a durometer reading of 80-90. The edge strip 512 may be fitted over the edge 518 of the panel 510 and extend downward along both sides of the panel 510. The portions extending downward along the side of the panel 510 may include locking features 522 that engage with locking features 520 of the sub-assembly panel 510. The locking features may be provided on one or both sides of the sub-assembly panel 510. Accordingly, the edge strip 512 may be locked into place over the edge 518 of the sub-assembly panel 510.

One of the sides of the edge strip may extend along the side of the sub-assembly panel 510 and include a sealing portion 516. The sealing portion 516 may be formed of an EPDM or TPV closed cell sponge material. The EPDM or TPV closed cell sponge material may have a density of about 0.2-0.5 g/cm$^3$. In one example, the sponge material may be bonded to an EPDM or TPV solid rubber portion of the of the edge strip 512 that extends over the edge 518 and engages the panel 510. Although, it is understood that other elastic materials may be used for the sealing portion 516. However, the sealing portion 516 may be attached to an attachment surface 514 of the edge strip 512 using various methods described throughout this application. The edge strip 512 may be extruded to match to an angle of the edge 518 of the panel 510 and for example present the sealing portion 516 parallel to a front surface of the panel and the foam-in-place seal 530. The locking features may force the sealing portion 516 of the edge strip 512 against the foam-in-place gasket 530.

While the engaging portion of the edge strip 512 may be formed of a higher density material than the sealing portion 516, the engaging portion of the edge strip 512 may also be formed of the same material as the sealing portion 516 or a material similar to the density of the sealing portion 516. The edge strip 512 may be snapped over the edge 518 or slid onto the edge 518 from the side of the panel 510. Further, the edge strip may be extruded or molded or over-molded onto the panel 510 and may have a top edge that is straight or forms a transitional curve. While the sealing portion 516 is shown a solid, the sealing portion 516 may be hollow, for example as shown in FIG. 7.

The sub-assembly panel 510 may have a channel 532 configured to receive a foam-in-place gasket around the perimeter of the rest of the sub-assembly panel that is not in the region where the rails are overhanging the edge of the sub-assembly panel. As such, a foam-in-place gasket 530 may be applied within the channel 532 around the perimeter of the sub-assembly panel 510. A plasma or primer treatment may be applied to the channel 532 prior to the application of the foam-in-place gasket 530 to improve adhesion between the surface of the channel 532 and the foam-in-place gasket 530.

The sealing portion 516 and the foam-in-place gasket 530 may contact each other to form a contiguous seal around the perimeter of the panel. The side of the sealing portion 516 may overlap with the side of the foam-in-place gasket 530 to provide an improved sealing between regions of the sub-assembly panel 510 and the edge strip 512. The sealing portion 516 of edge strip 512 may overlap the foam-in-place gasket 530 in a direction parallel with the edge. In some implementations, the sealing portion 516 of edge strip 512 may be flat and abut the foam-in-place gasket 530 in a direction perpendicular with the edge and substantially in plane with the panel 510. In some implementations, the sealing portion 516 of edge strip 512 may form a horizontal overlap region with a longitudinal side of the foam-in-place gasket 530.

Figure 7A:
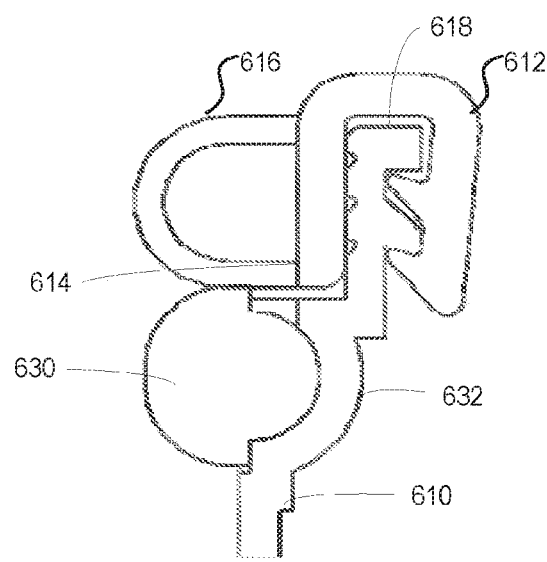
FIG. 7A is a sectional side view of another implementation of the panel assembly.
Figure 7B:
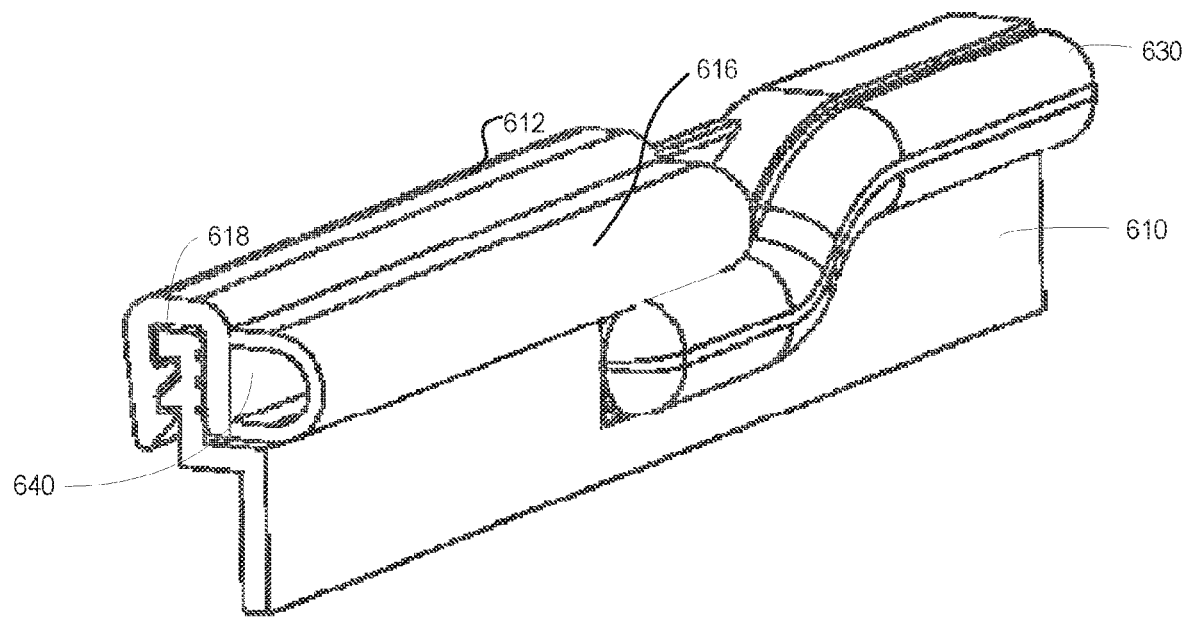
FIG. 7B is a perspective view of the panel assembly in FIG. 7A.

FIG. 7A is a sectional side view of another implementation of the panel assembly. FIG. 7B is a perspective view of the panel assembly in FIG. 7A. The panel assembly includes a sub-assembly panel 610, an edge strip 612, and a seal 630. The sub-assembly panel 610 may be a plastic module or plate. The sub-assembly panel may be formed to be installed within a hole on the inner panel of a door assembly. The seal 630 prevents moisture (water and air) from traveling through the hole between the door assembly and the panel assembly, as well as, reducing noise.

The sub-assembly panel 610 may include rails that overhang an edge 618 of the sub-assembly panel 610. The edge strip 612 may be placed over the edge 618 in the region where the rails overhang the sub-assembly panel. The edge strip 612 may be formed from an EPDM (Ethylene Propylene Diene Monomers) or TPV (Thermoplastic Vulcanizates) material. Further, the edge strip may be an extruded part and, therefore, may have a uniform cross-sectional profile along the length of the edge strip.

The edge strip 612 may be formed of a high durometer material, for example, the edge strip may have a durometer reading of 80-90. The edge strip 612 may be fitted over the edge 618 of the panel 610 and extend downward along both sides of the panel 610. The portions extending downward along the side of the panel 610 may include locking features that engage with locking features of the sub-assembly panel 610. The locking features may be provided on one or both sides of the sub-assembly panel 610. Accordingly, the edge strip 612 may be locked into place over the edge 618 of the sub-assembly panel 610.

One of the sides of the edge strip may extend along the side of the sub-assembly panel 610 and include a sealing portion 616. The sealing portion 616 may be formed of an EPDM or TPV closed cell sponge material. The EPDM or TPV closed cell sponge material may have a density of about 0.2-0.5 g/cm³. In one example, the sponge material may be bonded to an EPDM or TPV solid rubber portion of the of the edge strip 612 that extends over the edge 618 and engages the panel 610. Although, it is understood that other elastic materials may be used for the sealing portion 616. However, the sealing portion 616 may be attached to an attachment surface 614 of the edge strip 612 using various methods described throughout this application. The sealing portion 616 may form a hollow tube such as a bubble. One end of outer wall of the tube may be bonded to and extend away from the attachment surface 614. The other end of the outer wall of the tube may loop around forming a hollow passageway and be bonded to another portion of the attachment surface 614.

The edge strip 612 may be extruded to match to an angle of the edge 618 of the panel 610 and for example present the sealing portion 616 parallel to a front surface of the panel and the foam-in-place seal 630. The locking features may force the sealing portion 616 of the edge strip 612 against the foam-in-place gasket 630.

While the engaging portion of the edge strip 612 may be formed of a higher density material than the sealing portion 616, the engaging portion of the edge strip 612 may also be formed of the same material as the sealing portion 616 or a material similar to the density of the sealing portion 616. The edge strip 612 may be snapped over the edge 618 or slid onto the edge 618 from the side of the panel 610. Further, the edge strip may be extruded or molded or over-molded onto the panel 610 and may have a top edge that is straight or forms a transitional curve. While the sealing portion 616 is shown a solid, the sealing portion 616 may be solid, for example as shown in FIG. 5 and FIG. 6.

The sub-assembly panel 610 may have a channel 632 configured to receive a foam-in-place gasket around the perimeter of the rest of the sub-assembly panel that is not in the region where the rails are overhanging the edge of the sub-assembly panel. As such, a foam-in-place gasket 630 may be applied within the channel 632 around the perimeter of the sub-assembly panel 610. A plasma treatment or primer may be applied to the channel 632 prior to the application of the foam-in-place gasket 630 to improve adhesion between the surface of the channel 632 and the foam-in-place gasket 630.

The sealing portion 616 and the foam-in-place gasket 630 may contact each other to form a contiguous seal around the perimeter of the panel. The side of the sealing portion 616 may overlap with the side of the foam-in-place gasket 630 to provide an improved sealing between regions of the sub-assembly panel 610 and the edge strip 612. The sealing portion 616 of edge strip 612 may overlap the foam-in-place gasket 630 in a direction parallel with the edge. In some implementations, the sealing portion 616 of edge strip 612 may be flat and abut the foam-in-place gasket 630 in a direction perpendicular with the edge and substantially in plane with the panel 610. In some implementations, the sealing portion 616 of edge strip 612 may form a horizontal overlap region with a longitudinal side of the foam-in-place gasket 630.

Various feature described in each of these implementations may be used in combination together. For example, the foam-in-place gasket applied to the edge strip may form any of the overlap regions described with respect to the other figures. As such, the disclosure provides new an novel features that address specific technical manufacturing problems.

As a person skilled in the art will readily appreciate, the above description is meant as an illustration of the principles of this disclosure. This description is not intended to limit the scope or application of this disclosure in that the invention is susceptible to modification, variation and change, without departing from spirit of this disclosure, as defined in the following claims.

We claim:

1. A window regulator sub-assembly for a door assembly having an inner door panel forming an aperture and an outer door panel, the window regulator sub-assembly comprising:
   a sub-assembly panel, adapted to be fastened to the inner door panel and having a perimeter adapted to be sealed around the aperture;
   at least one rail extending from the sub-assembly panel, the at least one rail overhanging an edge of the panel in a first region of the perimeter;
   an edge strip configured to seal the sub-assembly panel extending along the first region of the perimeter, the edge strip forming a channel and engaging opposing first and second sides of the panel;
   a first gasket affixed to and extending along the edge strip, the first gasket adapted to seal against the inner door panel along the first region of the perimeter and
   a second gasket comprising a foam-in-place gasket that is applied to the sub-assembly panel around a second region of the perimeter of the sub-assembly panel the second gasket applied to only one of the first and second sides of the panel, the second gasket abutting or overlapping ends of the first gasket to form a contiguous seal around the sub-assembly panel perimeter between the inner door panel and the sub-assembly panel.

2. The window regulator sub-assembly according to claim 1, further comprising the edge strip is extruded.

3. The window regulator sub-assembly according to claim 1, further comprising the edge strip is comprised of an EPDM or a TPV material.

4. The window regulator sub-assembly according to claim 1, further comprising the edge strip has locking features that engage locking features on the sub-assembly panel at one of the first and the second sides of the panel.

5. The window regulator sub-assembly according to claim 1, further comprising the first gasket being hollow.

6. The window regulator sub-assembly according to claim 1, further comprising the first gasket having a density lower than a density of the edge strip.

7. The window regulator sub-assembly according to claim 1, further comprising the first gasket is comprised of an EPDM or a TPV closed cell sponge.

8. The window regulator sub-assembly according to claim 1, wherein the edge strip further comprises a channel that receives the first gasket comprising a foam-in-place gasket.

9. The window regulator sub-assembly according to claim 1, further comprising the sub-assembly panel includes a channel formed on one of the first and the second sides that receives the second foam-in-place gasket.

10. The window regulator sub-assembly according to claim 1, further comprising the at least one rail is a window regulator rail.

11. The window regulator sub-assembly according to claim 1, further comprising the first gasket overlaps the second gasket in a direction parallel with the edge and to a plane of the sub-assembly panel.

12. The window regulator sub-assembly according to claim 1, further comprising the first gasket overlaps the second gasket in a direction perpendicular with the edge and substantially in plane with the sub-assembly panel.

13. The window regulator sub-assembly according to claim 1, further comprising the first gasket extends from the edge of the sub-assembly panel to form an overlap with a longitudinal side of the second gasket.

* * * * *